United States Patent [19]

Harris, Sr.

[11] 4,404,862

[45] Sep. 20, 1983

[54] MICRODISPENSING SPRINGS WITH A NEEDLE IN A TUBULAR EXTENSION

[75] Inventor: Rano J. Harris, Sr., Baton Rouge, La.

[73] Assignee: Dynatech Precision Sampling Corporation, Baton Rouge, La.

[21] Appl. No.: 317,070

[22] Filed: Nov. 2, 1981

[51] Int. Cl.[3] .............................................. G01F 11/06

[52] U.S. Cl. ................................ 73/864.16; 604/207; 604/241; 73/864.87

[58] Field of Search ........... 73/864.16, 864.13, 864.87; 222/47; 604/207, 213, 222, 239, 240, 241, 242, 243

[56] References Cited

U.S. PATENT DOCUMENTS

| | | | |
|---|---|---|---|
| 2,886,316 | 4/1959 | Ayala | 604/240 X |
| 3,050,059 | 8/1962 | Wall et al. | 604/222 |
| 3,216,616 | 11/1965 | Blankenship, Jr. | 604/207 X |
| 3,344,787 | 10/1967 | Maclean | 604/241 |
| 3,417,904 | 12/1968 | McLay | 604/207 X |
| 3,677,448 | 7/1972 | Harris, Sr. et al. | 222/387 |
| 4,063,662 | 12/1977 | Drummond et al. | 604/207 X |

FOREIGN PATENT DOCUMENTS

| | | | |
|---|---|---|---|
| 1907409 | 9/1969 | Fed. Rep. of Germany | 73/864.16 |
| 2622515 | 12/1976 | Fed. Rep. of Germany | 604/240 |
| 994386 | 11/1951 | France | 604/240 |

*Primary Examiner*—James J. Gill
*Assistant Examiner*—Tom Noland
*Attorney, Agent, or Firm*—Llewellyn A. Proctor

[57] ABSTRACT

A needle mount, or assembly for installation of a tubular needle on the forward end of an essentially otherwise conventional syringe. The syringe includes the conventional barrel, reciprocable plunger mounted from the rearward end and within the bore of the barrel, and tubular needle mounted on the forward end of the barrel. The bore at the forward end of the barrel is provided with a conical entry feature, and a hub with a central opening which can be aligned upon the conical entry is mounted on the forward end of the barrel. The needle mount is constituted of a tubular extension member within an end of which the needle can be inserted, the opposite end thereof being sealed for extension into the conical entry, the needle mount further including a stop located on the tubular extension member intermediate the sealed end and its forward terminal end, a coil spring concentrically and coaxially mounted on the tubular extension member forward of the stop, and cap engagable with the hub within which the spring end portion of the tubular extension member and stop thereof are retained, and seated, to form a composite assembly for installation and buffered retention of the needle in place on the forward end of the barrel.

5 Claims, 3 Drawing Figures

MICRODISPENSING SPRINGS WITH A NEEDLE IN A TUBULAR EXTENSION

Syringes for use in repetitively dispensing or injecting small, or infinitesimal accurately measured quantities of fluids into analytical instruments, e.g. gas chromatographs, mass spectrometers and the like, have been known for some years. Among known precision syringes used for this purpose, many are capable of accurtely dispensing fluids which measure one-tenth of a microliter, and less. Syringes are typically constituted of a tubular body, or barrel, a plunger reciprocably mounted on one end of the barrel, within the bore and traversable the length thereof, and a cannula or tubular needle mounted on the opposite end of the barrel. Typically, an accurtely measured amount of a fluid specimen is drawn into and displaced from the bore of the barrel, or the bore of the needle, or both, by action of the plunger.

The tubular needle is sometimes directly concentrically affixed or sealed within the bore at the forward end of the barrel, particularly if the needle is constituted of a relatively high strength material and the wall is relatively thick. Often the needle is concentrically mounted on the forward end of a barrel via use of a Luer mount, or similar mount. In U.S. Pat. No. 3,677,448 to Rano J. Harris, Sr. and Rano J. Harris, Jr., e.g., the needle which is provided with an extending stop, or shank, is positioned in the forward end of the barrel and retained in place by threadably engaged tubular metal coupling members. A first of the coupling members is mounted on the forward end of the barrel, and the rearward end of the needle is passed through an opening through said first coupling member into the barrel bore. The needle is retained in place within said barrel, and supported upon said first member via means of a second coupling member provided with an opening in which the needle is passed, the said second coupling member being threadably engaged to said first coupling member to retain the needle in place on the forward end of the barrel.

In many applications however, the needles are not constructed of mechanically strong materials, and in fact the materials employed are often structurally weak. The walls of the needles are sometimes thin, and brittle. It is thus necessary on occasion to construct needles of materials which are chemically inert, or non-reactive with the fluids to be sampled, e.g. strong acids, or bases. The walls forming such needles are often necessarily thin, fragile and incapable of withstanding strongly applied forces without fracturing or breaking. For example, it is desirable to construct very small diameter needles of fused silica, glass, or quartz. While needles constructed with such materials are highly non-reactive chemically with many fluids, they are structurally weak and incapable of withstanding highly compressive mechanical forces without fracturing, or breaking.

It is, accordingly, an object of this invention to obviate many of the disadvantages of prior art syringes, particularly by providing a novel buffer assembly for mounting needles on syringes which avoid, or suppress the application of excessive force upon the needle.

A particular object of this invention is to provide a new and improved syringe, particularly one providing a novel buffered needle mount which avoids or suppresses shock due to the application of force upon the needle at the time of mounting, and subsequent to the time of mounting, especially a needle mount of such character which makes possible the mounting of thin or fragile needles which are incapable of withstanding strongly applied forces without fracturing, or breaking.

A more particular object is to provide a buffered needle mount by virtue of which needles constructed of various materials, especially structurally weak materials, can be mounted upon syringe barrels to provide superior seals, less leakage about the seals, greater facility in replacement or in construction and assembly, with less fracturing or breakage of the needles, if any, than in conventional needle mounts.

A specific object is to provide means as characterized for mounting very small diameter thin walled needles constructed of fused silica, glass, quartz, stainless steel and the like.

These objects and others are achieved in accordance with the present invention embodying a needle mount, or assembly for the installation of a tubular needle on the forward end of an essentially otherwise conventional syringe. The bore at the forward end of the barrel, opposite the end of the barrel wherein the reciprocable plunger is mounted, is provided with a conical entry feature, and an affixed hub provided with an opening communicating said conical entry and the hub exterior. The needle mount is constituted of a tubular extension member having a sealed rearward end which extends into said conical barrel entry and within the forward end of which the tubular needle is, or can be coaxially inserted or mounted, and it further includes a stop located upon and positioned intermediate the terminal ends of said tubular extension member, a coil spring concentrically and coaxially mounted on the forward end of said tubular extension member, the rearward end of said spring of which is seated against the forward side of said stop, and cap engagable with upon the forward end of said hub within the forward inside face of which said coil spring is seated, and portion of said tubular extension member and stop thereof retained, form a composite assembly for installation and buffered retention of the tubular needle in place on the forward end of the barrel.

This assembly overcomes many of the disadvantages associated with conventional means for mounting tubular needles in place on the forward end of syringe barrels. The tubular extension member, an extension of the needle, mechanically shields and protects the rearward portion of the needle inserted therein. It is integral with the needle, and an extension thereof in its fluid withdrawal and dispensing functions. The tubular extension member also provides, by means of its stop and coil spring which is seated upon said tubular extension member between said stop and cap (the latter of which secures the assembly via engagement with the hub at the forward end of the barrel), a spring loaded coil which seals the tubular extension member and tubular needle in place without fracturing, or breaking the needle. In the installation of this assembly, proper tensioning of the seated spring is assured, the seal at the rearward end of said tubular extension member being pushed by a preselected force into the forward end of the bore of said barrel without fracturing, or breaking the needle. Hence, even structurally weak needles, or needles incapable of withstanding highly compressive mechanical forces, can be mounted on the forward end of a syringe without the needle being fractured, or broken.

These and other characteristics of a preferred buffered needle mount for a syringe, and its principle of operation, will be more fully understood by reference to the following detailed description. Similar numbers are used to represent similar parts, components, or features in the different figures, and subscripts are used to designate a plurality of generally analogous parts or components.

Figure 1:
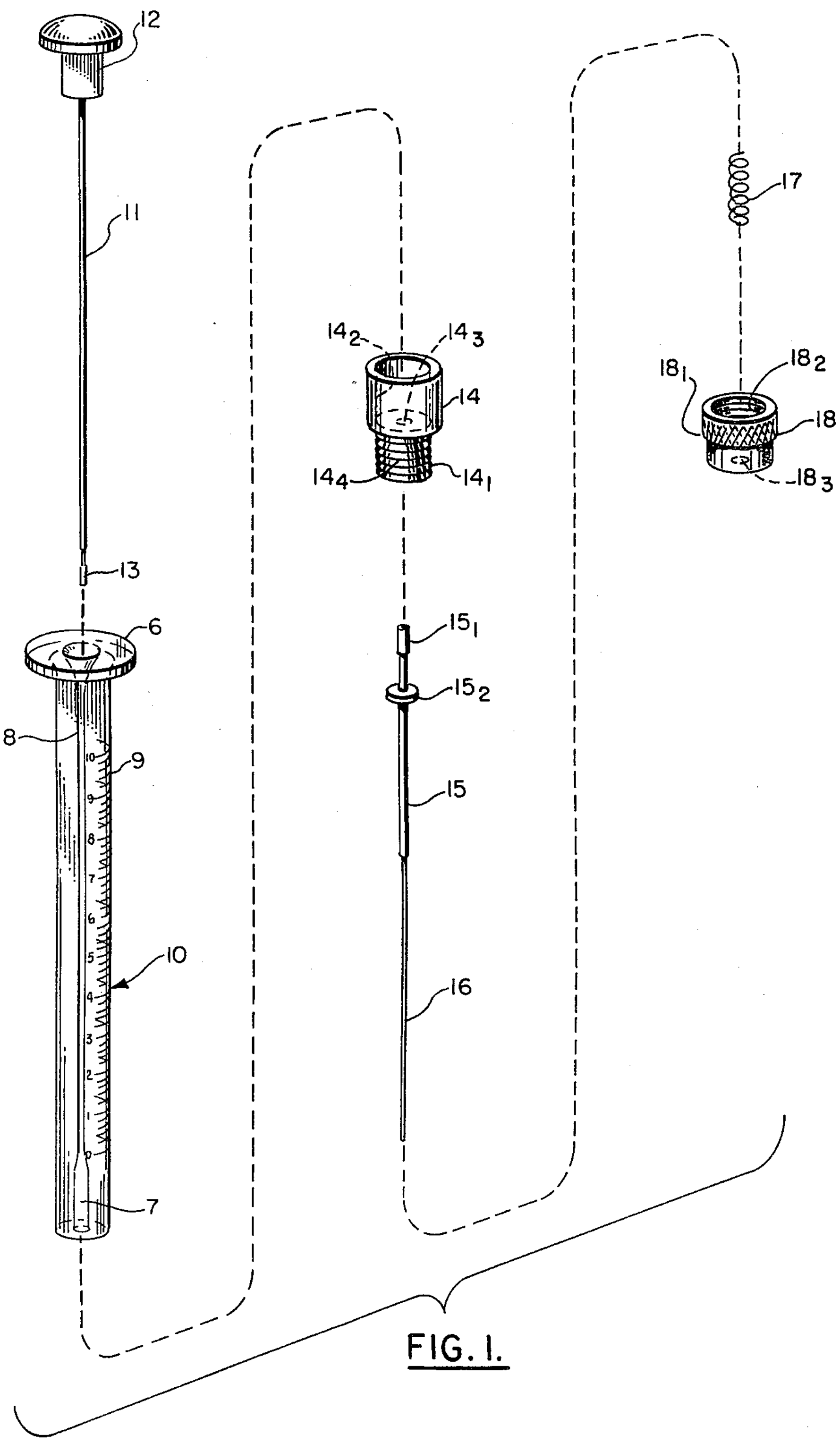
FIG. 1 depicts in perspective a disassembled view of the various components of the syringe of this invention.
Figure 2:
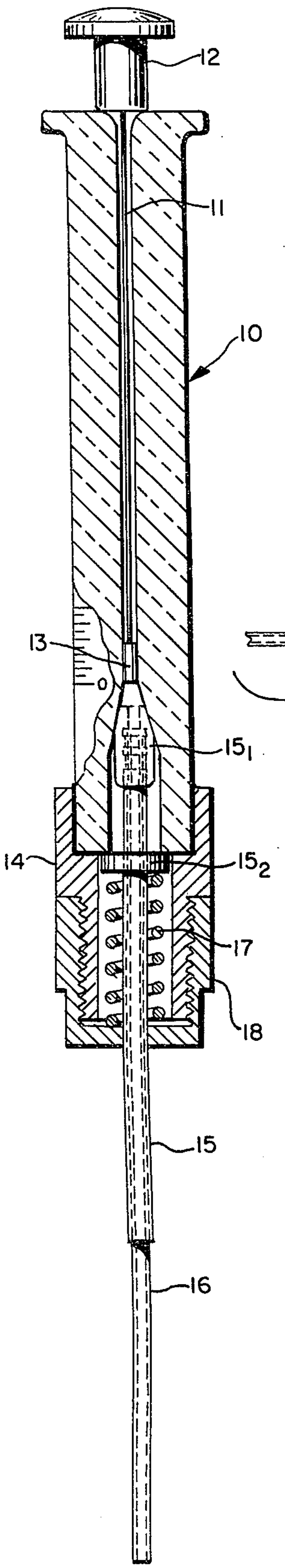
FIG. 2 depicts in section the assembled syringe.

Referring to FIGS. 1 and 2, there is shown a syringe 10, inclusive of a tubular body or barrel 9 and a reciprocable plunger 11 which is slidably fitted into the bore 8 of the barrel 9. The rearward portion of the plunger 11 is provided with a stop or thumb button 12, and the forward end with a cylindricl shaped seal 13 which fits snugly within the bore 8 of the barrel 9. The seal 13 prevents passage of fluid to the rearward side of the seal, and in traversing the length of the bore it wipes fluid from the wall bore and forces, or displaces it to a position forward of the seal. The outer wall surface of the barrel 9 is scribed with indicia representative of the volume of the bore, which is directly related to the amount of fluid contained within the bore, and when the forward face of the seal 13 of plunger 11 is at the zero fill position the stop or thumb button 12 rests against the flange 6 located at the rear of barrel 9. The forward end of the barrel 9, in front of the zero fill position, is provided with a conical shaped-entry 7. The conical shaped entry 7 is located in the forward end of an otherwise conventional barrel and plunger assembly and, as such, provides a portion of the needle mount, or structural combination by virtue of which the needle 16 is mounted on the forward end of the barrel 9.

Referring initially, directly to FIG. 1: the tubular shaped hub 14 can be directly affixed upon the forward end of barrel 9 as via extension of the forward end of barrel 9 into the socket-like opening $\mathbf{14_2}$ of said hub 14, and said member sealed in place as via use of an epoxy resin or glue. A cannula, or tubular needle 16, it will be observed, is coaxially mounted in the forward end of a tubular extension member 15. The rearward terminal end of the extension member 15 is provided with a cylindrical seal $\mathbf{15_1}$, and the intermediate portion thereof is provided with a disc shaped spring stop $\mathbf{15_2}$. A helical shaped spring, or coil spring 17, is located forward on the tubular extension member 15, and can be concentrically located or mounted upon the tubular extension member 15 forward of the disc shaped spring stop $\mathbf{15_2}$. The sealed rearward end of the tubular extension member 15, viz. seal $\mathbf{15_1}$, can be passed through the axially aligned openings $\mathbf{14_4}$, $\mathbf{14_3}$ and lightly inserted within the conical entry 7 at the forward end of the barrel 9. With helical spring 17 in place upon the tubular extension member 15, the hub cap or cover 18 can be brought toward the installed tubular extension member 15, the needle 16 thereby extended through the opening $\mathbf{18_3}$ of said cap 18 and said members 14,18 secured together via threadable engagement between the external threads $\mathbf{14_1}$ on the forward, small diameter end of hub 14 and the internal threads $\mathbf{18_2}$ of said cap 18. The knurled exterior $\mathbf{18_1}$ facilitates rotation of cap 18 to threadably engage the two members 14,18 one with the other.

With reference to FIG. 2, it will thus be observed that the conical entry 7, hub 14 and cap 18 form, with the coil spring 17, tubular extension member 15 and needle 16, a composite assembly for installation of the needle 16 in place on the forward end of the barrel 9. In installed position, the seal $\mathbf{15_1}$ is located within the conical entry 7 of the barrel 9, and the tubular extension member 15 from which needle 16 is projected, is oriented by virtue of the threadably engaged members 14,18. The coil spring 17 is of preselected length and resiliency such that rotation, and tightening down of cap 18 will provide a desired, preselected force upon said spring 17 to adequately seat the seal 15 within the conical entry 7; but yet avoid excessive force which can damage the tubular extension member 15 and needle 16. Thus, it will be observed that the rearward end of coil spring 7 is seated against the forward face of spring stop $\mathbf{15_2}$ of tubular extension member 15, and the forward end of the coil sprig 7 is seated against inside forward wall of cap 18. Rotation of the cap 18 in one direction will decrease the distance between the forward face of spring stop $\mathbf{15_2}$ and the inside forward wall of cap 18 to increase the compressive force upon coil spring 7. The effect of the increased compression upon coil spring 7 is to exert a rearwardly directed force upon the tubular extension member 15, this force forcing seal $\mathbf{15_1}$ more deeply into the conical entry 7. Conversely, rotation of the cap 18 in the opposite direction will decrease the applied force. In either event, by providing a spring of preselected strength and length, the amount of force applied upon the tubular extension member 15 can be readily regulated within preselected limits.

Figure 3:
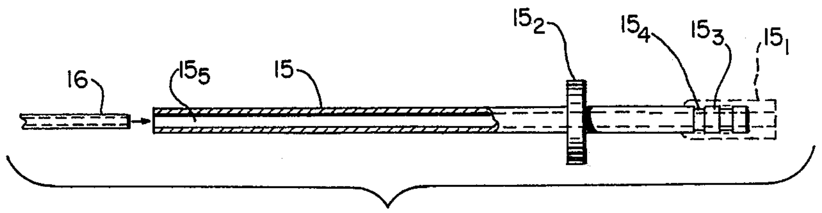
FIG. 3 depicts in partial section a sub-assembly of the syringe.

The tubular extension member 15 is, in its function, an extension of tubular needle 16, as best shown by reference to FIG. 3. The external diameter of needle 16 approximates the inside diameter of the bore through tubular extension member 15, and can be snugly fitted therein. So positioned, the bores through the two tubular members are coaxial and fluid can flow therethrough from the dispensing, or distal end of needle 16 to its proximate end, and through the bore of tubular extension member 15 into the bore 8 of the barrel 9. The enclosed rearward end of the needle 16 is shielded, and protected by the relatively thick walled tubular extension member 15 which in itself can sustain far greater mechanical shock than the relatively thin walled, more fragile needle 16. The rearward end of tubular extension member 15 is underscored, or provided with lands $\mathbf{15_3}$ and grooves $\mathbf{15_4}$ for aid in retaining the cylindrical shaped, tubular seal $\mathbf{15_1}$ in place on the terminal rearward end of said tubular extension member 15. The terminal end of the extension member 15 extends to the very end, and flushes with the rearward face of the tubular seal $\mathbf{15_1}$.

It is apparent that various substitutions, modifications and changes, such as in the location, or in the relative and absolute dimensions of the parts, size, shape, materials used and the like, can be made without departing the spirit and scope of the invention as will be apparent to those skilled in the art.

Having described the invention, what is claimed is:

1. In apparatus useful for dispensing small, or infinitesmal accurately measured quantities of a fluid, which embodies a tubular barrel having a bore therethrough, a plunger reciprocably mounted within the bore from a rearward end of said barrel, a tubular extension member mounted and sealed within a forward end of said barrel, and a tubular needle mounted in said tubular extension member such that a fluid can be drawn into the tubular needle from a dispensing end thereof by withdrawal of the plunger within the barrel, and dispensed from the dispensing end of the needle by forward movement of said plunger within the barrel, the improvement which, in combination, comprises a conical entry located within the forward end of the barrel coaxially aligned and contiguous with the bore of said barrel, said tubular extension member provided with a bore therethrough having an internal diameter substantially equal to an external diameter of the tubular needle, a rearward end of said tubular needle mounted in said tubular extension member to provide coaxially aligned bores through which fluid can flow from the dispensing end of said needle through the bore of said tubular extension member, a tubular seal mounted on a rearward end of said tubular extension member, the rearward end of said tubular extension member being extendable into the barrel, a stop externally located on said tubular extension member intermediate a forward terminal end of the tubular extension member and the tubular seal, a hub mounted on the forward end of said barrel and having an opening therein through which the sealed rearward end of said tubular extension member can pass for sealing engagement with the conical entry at the forward end of said barrel, a coil spring concentrically mounted about the tubular extension member, a rearward end of the spring seated against the stop of said tubular extension member, a cap having an opening through which the needle and forward end of said tubular extension member extends, an inside forward wall of said cap providing a seating surface against which a forward end of said coil spring rests and is retained, said cap being adjustably engagable with said hub so that a preselected compressive force can be exerted upon said spring for retention of said needle and tubular extension member in place on the forward end of the barrel of the syringe without the application of excessive force.

2. The apparatus of claim 1 wherein the barrel is scribed with indicia representative of the volume of the bore through the barrel, the reciprocable plunger is capable of traversing the length of the bore, and a forward end of the plunger is capable of alignment with a zero fill position at the forward end of the barrel.

3. The apparatus of claim 1 wherein the conical entry into the forward end of the barrel is forward of a zero fill position, and the length of the conical entry is greater than the length of said tubular seal mounted on the rearward end of said tubular extension member.

4. The apparatus of claim 1 wherein a forward end of the hub mounted at the forward end of the barrel is externally threaded, a rearward end of the cap is internally threaded, and the hub and cap are threadably engagable one member with the other.

5. The apparatus of claim 4 wherein the forward end of the hub is of reduced diameter, the forward reduced diameter portion of the hub is externally threaded, the rearward end of the cap is internally threaded, and the hub and cap are threadably engagable one member with the other.

* * * * *